United States Patent [19]

Egnell

[11] 4,253,386

[45] Mar. 3, 1981

[54] PROCEDURE FOR MANUFACTURE OF WHEY PRODUCTS IN CONTINUOUS PRODUCTION LINE

[75] Inventor: Eric R. Egnell, Tyresö, Sweden

[73] Assignee: Nedre Norrlands Producentforening ek, Ostersund, Sweden

[21] Appl. No.: 952,934

[22] Filed: Oct. 20, 1978

[30] Foreign Application Priority Data

Oct. 28, 1977 [SE] Sweden ................................. 7712167

[51] Int. Cl.³ ............................................... A23C 3/02
[52] U.S. Cl. ....................................... 99/453; 426/583
[58] Field of Search ...................... 426/583, 491, 492; 99/453, 452, 483

[56] References Cited

U.S. PATENT DOCUMENTS

| | | | |
|---|---|---|---|
| 2,119,614 | 6/1938 | Webb et al. | 426/583 |
| 2,336,461 | 12/1943 | Beardslee | 426/583 X |
| 2,555,514 | 6/1951 | Sharp et al. | 426/583 |
| 2,930,696 | 3/1960 | Rodgers et al. | 426/583 X |
| 4,057,655 | 11/1977 | Okada et al. | 426/583 |

*Primary Examiner*—Robert W. Jenkins

[57] ABSTRACT

The production of whey products such as whey butter and whey cheese is effected by first concentrating raw whey to a total solids content of 40 to 80% by weight, thereafter adding non-heat sensitive raw materials and adjusting the pH thereof to value of between 5.8 and 6.4. The concentrate is thereafter heated in order to precipitate the whey proteins therefrom and kept at a predetermined elevated temperature for a period of time in order to insure the quality of the product. Heat sensitive additives are thereafter added and finally the concentrate is homogenized or comminuted by other means. The concentrate is cooled to a temperature below thirty degrees and thereafter stored until a suitable consistency is obtained.

5 Claims, 1 Drawing Figure

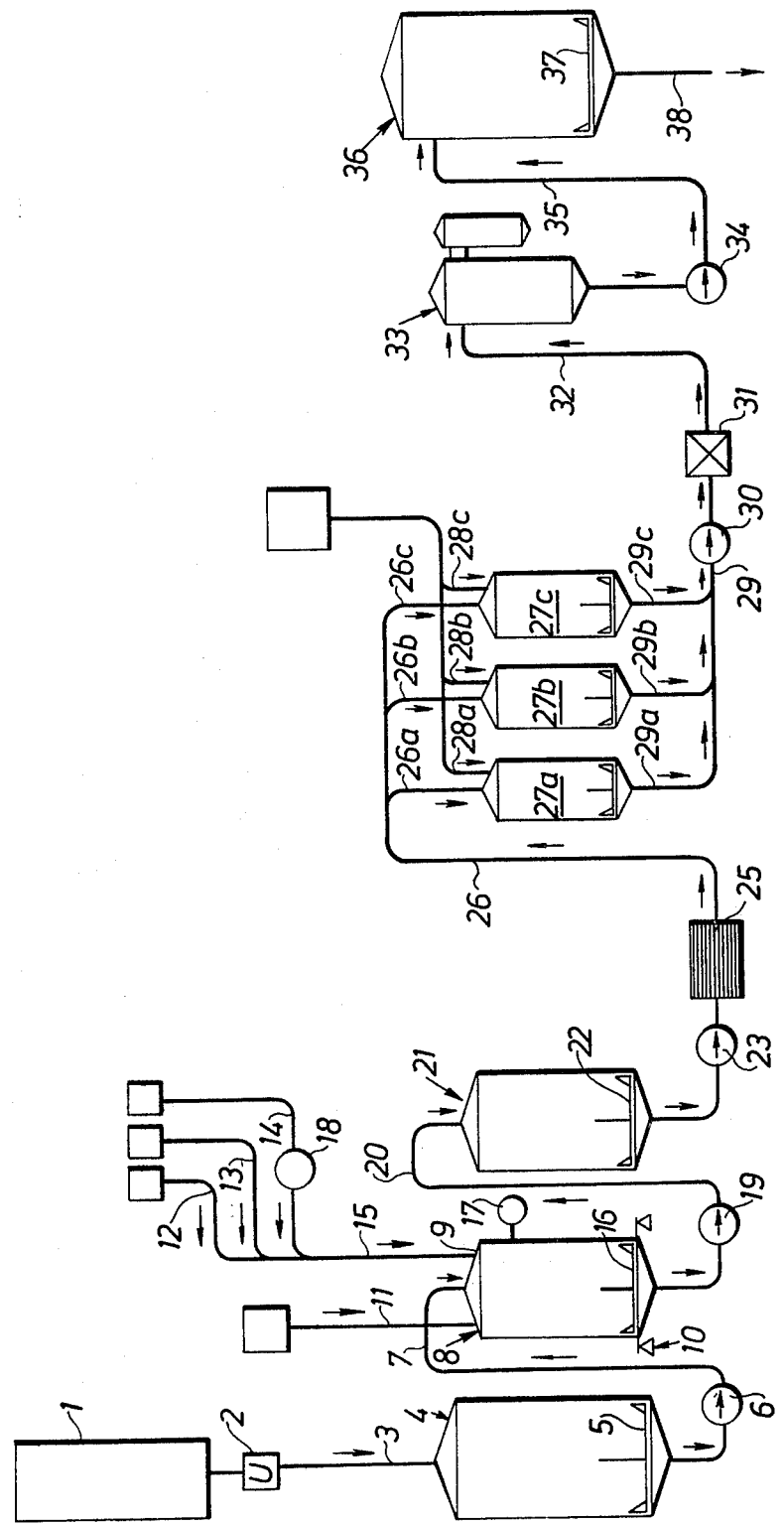

PROCEDURE FOR MANUFACTURE OF WHEY PRODUCTS IN CONTINUOUS PRODUCTION LINE

The present invention relates to a procedure and a device for manufacture of whey products. By whey product is meant a product obtained by concentration of whey made from cow's or goat's milk, with or without addition of milk constituents and other sugar species than lactose.

Whey products, chiefly whey-cheese and whey-butter, have for a long time been made on farms and shieldings. For this production whey is evaporated in open vessels and to the resulting more concentrated whey is added cream, milk, sugar or different flavourings. Depending on the desired final product the evaporation is continued for different lengths of time, after which the contents of the vessel are left to cool into finished product.

Characteristic of this manufacture is that it is done batchwise and that the various phases of the process—evaporation, browning, cooling—more or less overlap.

The present commercial production technique, too, is based on batchwise production, whereas a stricter division has been made between the various phases of the process. Thus, in modern whey-pans the evaporation of the whey concentrate is done under vacuum. By this means the boiling point of the concentrate is lowered owing to the lower pressure of evaporation. The lower temperature prevents overheating and too strong browning of the product during the evaporation. If stronger browning is desired, i.e. a darker colour of the product, the process can continue under the desired pressure in the same pan. The product is finally cooled in separate coolers.

The modern batchwise manufacture of whey products is thus done by a procedure comprising the following stages:

(1) Concentration of whey by evaporation, either in conventional single- or multistage evaporators, to a total solids (T.S.) content of 35–45%.
(2) Adjustment of the degree of acidity to a desired °Th value (°Th signifies ThÖrner degrees, an acidity measure customarily used in the dairy industry). This value varies for different T.S. contents in the concentrated whey.
(3) Precipitation of whey proteins by heating to boiling point at atmospheric pressure.
(4) Concentration by evaporation to desired T.S. content, which for whey-butter is 52–62% and for whey-cheese 77–83%.
(5) "Browning", i.e. heating at about 100° C. until the desired colour and taste are obtained.
(6) Homogenizing, i.e. powerful mechanical working of the concentrate if the product is whey-butter or less powerful working if the product is whey-cheese.
(7) Cooling. Whey-butter is cooled down to 15°–20° C., at which temperature it is still fairly fluid. Cooling of the concentrate for making whey-cheese is usually done in two stages, the concentrate being cooled in the first stage to a temperature at which it is still fluid.
(8) The concentrate is drawn into aluminum moulds and cooled in a refrigerating room. The cheese is then released from the mould and packed after being cut to size.

This procedure has several disadvantages. It is laborious and requires special proficiency on the part of the operators. The many batches resulting from batchwise manufacture make it difficult or impossible to exercise accurate supervision and rational regulation of the process in order to attain the correct consistency, taste and colour of the product. This is a great disadvantage, as these variables constitute the chief criteria of the quality of the product. Concentration by evaporation in vacuum pans is uneconomical since it requires large specific quantities of energy.

The apparatus used for the batchwise manufacture is not suited for automatic cleaning. The vacuum pans, moreover, are large, take up much space, and have a high noise level, chiefly because of the scrapers with which they are equipped. The working environment is also impaired by the large quantities of steam formed by boiling in open pans.

The invention provides for a continuous production process for manufacture of whey products, the process being divided into specific stages and so allowing good supervision and control. The input of raw materials and output of end-product take place continuously, while certain substages in the manufacture may be intermittent or consist of alternative flow paths for the concentrate.

To attain the desired supervision and control of the process, a new method of precipitation of proteins has been devised in the procedure according to the invention. In the conventional procedure the acidity of the whey concentrated to 35–45% T.S. is adjusted with NaOH or $Na_2CO_3$ to 55° Th before precipitation of the whey protein. But it has been found that measurement of the acidity by the Thörner method is not appropriate for automation of the process. Adjustment of the acidity to an appropriate pH-value gives a better result and permits the introduction of advanced measuring and dispensing equipment.

These disadvantages of batchwise manufacture of whey products are eliminated and a continuous procedure, permitting good control and supervision of the manufacturing process, is attained according to the invention by first increasing the total solids content, preferably by evaporation of whey in several stages to a content of 40–80 percentage by weight, proportioning and adding non-heat-sensitive raw materials, and adjusting the acidity of the concentrate/raw material to a predetermined value by addition of a pH-regulating agent of food quality a pH-value between 5.8 and 6.4, preferably between 6.0 and 6.2. The concentrate is then heated to a temperature between 90° and 105° C., preferably between 96° and 100° C., in order to precipitate whey proteins, the concentrate is kept at a predetermined temperature for a predetermined time in order to ensure the quality of the product, after which heat-sensitive additives, such as flavouring agents and preservatives, are added to the concentrate. Finally the concentrate is homogenized or comminuted by other means, chiefly the precipitated proteins, by mechanical processing of predetermined intensity, the concentrate is cooled down to a temperature below 30° C., preferably to between 15° and 20° C., and is stored in a product tank in order to give it a suitable consistency.

It is advantageous that proportioning and addition of non-heat-sensitive raw materials should be done by continuous dispensing or batchwise by means of an intermittent weighing process between, before or after continuous processes in the process chain.

Other advantages are obtained by arranging a hot-holding period by alternate feed of the concentrate into at least two holding tanks, preferably with agitator, the concentrate exhibiting essentially constant volume flow, or by pumping the concentrate through a continuously functioning holder cell.

Finally it is advantageous that the proportioning and addition of heat-sensitive raw materials and additives should be done batchwise by means of an intermittent weighing or volume-measurement procedure or continuously.

For implementation of the procedure according to the invention it is advantageous to provide in sequence at least one evaporator, preferably of multistage type,
one proportioning and dispensing apparatus, designed for intermittent or continuous operation,
one pH-meter, designed for supervision and control of the process,
one heat exchanger, preferably of scraper or tubular type, for heating of the concentrate,
one holding tank device or holder cell for holding a specific volume of the concentrate for a predetermined time at a predetermined temperature,
one homogenizer or other equipment designed to comminute the constituents of the product, chiefly precipitated proteins,
one cooling device, preferably of flash type, designed to cool off the concentrate instantaneously or very quickly, and
one product tank for accommodation of the product prior to its packaging.

The FIGURE of the drawing is a flow diagram showing the function of the apparatus.

The invention will now be described with reference to the attached drawing. The whey is brought into a conventional multistage evaporator 1, preferably furnished with a final thickener, for concentration to a T.S. content of 40–80% depending on the desired product. The evaporator is controlled by a device 2 which continuously measures the density, which is proportional to the T.S. content in the whey concentrate. In this way a raw material is obtained with predetermined and constant T.S. content, which is of great significance for the consistence and quality of the final product. The concentrate is then led continuously through a pipe 3 to a buffer tank 4 containing an agitator mechanism 5. From the tank the concentrate is then pumped by a pump 6 through a pipe 7 intermittently to a weighing tank 8, where dispensing and addition of different substances take place batchwise as described below. This addition as well, however, can be done by dispensing "on line", i.e. continuously.

The weighing tank 8 consists of a container 9 supported by force-sensing elements 10 containing measuring devices for electronic weighing and dispensing equipment. Depending on the desired final product raw materials are added to the weighing tank 8 which are not heat-sensitive, e.g. cream, butter-fat, sugar or sorbitol. This is done through pipes 11, 12, 13 and 14, the three latter of which are combined in a common pipe 15 to the weighing tank.

In this stage of the production process the acidity is also adjusted to the desired pH-value by addition of NaOH or other pH-adjusting agent. The pH-value is adjusted between the limits 5.8 and 6.4, but preferably between 6.0 and 6.2. The concentrate and the added ingredients are kept in movement and mixed by an agitator 16 in the container 9. The resulting pH-value can be read on a measuring and control instrument 17, which controls a dispensing pump 18 for pH-adjusting agent.

When the batch has been dispensed it is pumped by pump 19 through the pipe 20 to a buffer tank 21 with an agitator 22. The concentrate thus enters this tank intermittently, whereas the outflow from the tank is continuous. The pump 23 pumps the concentrate from tank 21 through pipe 24 to a heat exchanger 25.

The temperature of the concentrate at the entry to the heat exchanger is about 60° C. and at its outlet about 100° C. As the concentrate is viscous, the heat exchanger should be of scraper or tubular type. On heating to about 100° C. the whey proteins are precipitated.

From the heat exchanger the concentrate is taken through a pipe 26 to three parallel or shunted pipes 26a, 26b, 26c, which intermittently and alternately can lead the concentrate to three containers 27a, 27b, 27c furnished with agitators. Additives such as flavourings, preservatives and iron can be added to the concentrate in the various containers through a feed pipe 28 with branch or shunt pipes 28a, 28b, 28c.

The continuous flow of concentrate through pipe 26 can thus be led alternatively and intermittently to one of the three tanks. The concentrate can be kept in the holding tank for the time required for the desired product and in this stage of the process one can, for example, obtain the desired colour and taste of the final product. The holding time in the tanks can be varied from a few minutes to a few hours depending on the volume of the tanks and on the capacity of the other equipment. The holding tanks have a heating jacket and thermostat in order to be able to keep the temperature of the concentrate constant.

After this stage the concentrate is pumped through outlet pipes 29a, 29b, 29c and through a common pipe 29 by the pump 30 to a homogenizer 31. This comminutes the precipitated whey proteins at a pressure of 5–10 MPa. The concentrate is then taken through pipe 32 to a cooler 33, where very rapid cooling takes place so as to obtain small and uniform lactose crystals, which is essential for the consistence of the product. After being cooled, the temperature of the concentrate should be between 5° and 40° C., preferably between 15° and 20° C. A vacuum cooler or a scraper heat exchanger is used for this cooling process.

After being cooled down the concentrate is pumped by a pump 34 through pipe 35 to a product tank 36, preferably with agitator 37. The final product is collected in the tank and then taken out through the outlet 38 for packing.

The dispensing of the heat-sensitive additives, which is done through pipe 28, can instead be done "on line", i.e. continuous dispensing before homogenization and cooling.

For manufacture of whey-cheese a higher T.S. content is desired, so that additional evaporation is required. After the concentration in the multistage evaporator to about 60% T.S., the concentration continues in a subsequent evaporator, specially designed for the purpose, to about 80% T.S. For whey-cheese manufacture the concentrate is cooled only to about 80° C. in the first stage and is then packed and finally cooled to about 20° C.

As noted, apart from whey from cheese or caseinate made from cow's milk as raw material for manufacture of whey products by the described procedure, whey from goat-cheese manufacture can also be used. So can mixtures of these types of whey, or cow's or goat's milk added to them. Whey from cheese or caseinate manufacture from milk or other domestic animals may also be used.

Whey can moreover be used as raw material after having been wholly or partly deionized and/or wholly or partly hydrolysed with enzymes in order to obtain qualities of taste, colour and consistence desired in the final product.

The procedure according to the invention has distinct advantages over the technique known today:

(1) Smaller labour requirement, so lower labour cost per unit of weight of product.
(2) Smaller space requirement, so lower investment cost.
(3) Better working environment with, inter alia, less noise.
(4) The evaporation stage requires less energy and is thus more economical.
(5) Control of T.S. content, pH, temperature and holding times for the concentrate yields a better-quality and more uniform product.
(6) All production apparatus is suited for cleaning in place (CIP), i.e. cleaning of the apparatus is simpler, cheaper and quicker.

The embodiment of the invention exemplified above can be varied within the scope of the claims. This applies especially to the choice of components and apparatus, which in some respects may be of many alternative forms without thereby affecting the procedure according to the invention.

What is claimed is:

1. Apparatus for the production of ready-to-eat whey products such as whey butter, whey cheese and the like, comprising a sequential processing line having, in combination, an evaporator for receiving raw whey obtained from cow milk, goat milk or the like and for concentrating said whey to total solids of 40–80% by weight, first storage means for receiving the concentrate from said evaporator, means communicating with said first storage means for supplying non-heat-sensitive additives to said concentrate, and for adjusting the pH thereof, heat exchanger means connected to the outlet of said first storage means for heating said concentrate at a temperature between 90° and 100° C. for a time sufficient to precipitate the whey proteins, second storage means for receiving the concentrate from said heat exchanger, means communicating with said second storage means for adding heat-sensitive additives thereto, homogenizer means connected to the outlet of said second storage means for homogenizing said concentrate, cooling means connected to the outlet of said homogenizer for reducing said concentrate to a temperature below 30° C. and third storage means for holding said cooled concentrate until a desired consistency is obtained.

2. The apparatus according to claim 1, wherein said first storage means includes a proportioning tank and the means for supplying non-heat-sensitive additives includes a dispenser for continuously feeding said additives to said tank.

3. The apparatus according to claim 2, including means for weighing the contents of said proportioning tank and the means for supplying said additives include a dispenser for supplying a predetermined amount in batch to said tank on reaching a predetermined weight.

4. The apparatus according to claim 1 wherein said second storage means comprises at least two holding tanks and includes means for feeding said heated concentrate alternatively thereto in predetermined amounts at constant volume flow.

5. The apparatus according to claim 1, wherein the means for applying the heat-sensitive additives include a dispenser for feeding a predetermined amount in batch for feeding a continuous stream thereof at a predetermined rate.

* * * * *